(12) United States Patent
Gane et al.

(10) Patent No.: US 8,362,131 B2
(45) Date of Patent: Jan. 29, 2013

(54) PROCEDURE FOR MANUFACTURE OF AQUEOUS SUSPENSIONS OF CALCIUM CARBONATE AND SUSPENSIONS OBTAINED, AND THEIR USES

(75) Inventors: Patrick A. C. Gane, Rothrist (CH); Matthias Buri, Rothrist (CH)

(73) Assignee: Omya Development AG, Oftringen (CH)

( * ) Notice: Subject to any disclaimer, the term of this patent is extended or adjusted under 35 U.S.C. 154(b) by 91 days.

(21) Appl. No.: 12/737,366

(22) PCT Filed: Jul. 7, 2009

(86) PCT No.: PCT/IB2009/006173
§ 371 (c)(1),
(2), (4) Date: Jan. 5, 2011

(87) PCT Pub. No.: WO2010/004405
PCT Pub. Date: Jan. 14, 2010

(65) Prior Publication Data
US 2011/0105670 A1    May 5, 2011

(30) Foreign Application Priority Data

Jul. 7, 2008  (EP) ..................................... 08012233

(51) Int. Cl.
*C08K 3/26*    (2006.01)
*C08L 33/02*   (2006.01)
(52) U.S. Cl. .......................... 524/425; 524/556; 523/333
(58) Field of Classification Search .................. 524/425, 524/556; 523/333
See application file for complete search history.

(56) References Cited

U.S. PATENT DOCUMENTS

| | | | |
|---|---|---|---|
| 4,507,422 A | 3/1985 | Farrar et al. | |
| 4,868,228 A | 9/1989 | Gonnet et al. | |
| 5,533,678 A | 7/1996 | Strauch et al. | |
| 5,989,332 A | 11/1999 | Weitzel et al. | |
| 8,152,079 B2 | 4/2012 | Buri et al. | |
| 2006/0106118 A1 * | 5/2006 | Husband et al. | 516/78 |
| 2006/0287423 A1 * | 12/2006 | Michl et al. | 524/425 |
| 2008/0199419 A1 | 8/2008 | Suau et al. | |
| 2010/0025507 A1 | 2/2010 | Buri | |

FOREIGN PATENT DOCUMENTS

| | | |
|---|---|---|
| EP | 0 607 840 A1 | 1/1993 |
| EP | 0 850 685 A1 | 7/1998 |
| EP | 0 894 833 A2 | 2/1999 |
| EP | 0 894 836 A1 | 2/1999 |
| FR | 2 539 137 | 8/1982 |
| FR | 2 683 532 | 11/1991 |
| FR | 2 683 533 | 11/1991 |
| FR | 2 683 537 | 11/1991 |
| FR | 2 683 538 | 11/1991 |
| FR | 2 683 539 | 11/1991 |
| FR | 5 683 536 | 11/1991 |
| FR | 2 885 906 | 5/2005 |
| WO | 200039029 A2 | 7/2000 |
| WO | 0249765 A2 | 6/2002 |
| WO | WO 02/49766 A2 | 6/2002 |
| WO | 02070571 A1 | 9/2002 |
| WO | 2004014967 A2 | 2/2004 |
| WO | WO 2005/095466 A1 | 10/2005 |
| WO | 2007031870 A1 | 3/2007 |
| WO | WO 2007/077484 A2 | 7/2007 |
| WO | 2008107780 A1 | 9/2008 |

OTHER PUBLICATIONS

European Search Report dated Jan. 23, 2009 for European Application No. 08012233.6.
International Search Report dated Mar. 12, 2009 for PCT Application No. PCT/IB2009/006173.
Written Opinion of the International Searching Authority for PCT Application No. PCT/IB2009/006173.
Lamarche et al. "Influence of molecular weight of sodium polyacrylate in calcium carbonate aqueous dispersions." Industrial & Engineering Chemistry Product Research and Development, vol. 22, No. 1 (Mar. 1983) pp. 123-126.
Loiseau et al. "Dispersion of calcite by poly(sodium acrylate) prepared by revervsible addition-fragmentation chain transfer (RAFT) polymerization." Polymer 46 (2005).

\* cited by examiner

*Primary Examiner* — Vu A Nguyen
(74) *Attorney, Agent, or Firm* — Amster, Rothstein & Ebenstein LLP

(57) ABSTRACT

The object of the invention consists of a process for the manufacture of aqueous suspensions of calcium carbonate using an acrylic polymer with an average by weight molecular weight of between 8,000 g/mole and 15,000 g/mole and a molar content of less than 20% of polymeric chains of molecular weight less than 3,000 g/mole. It also concerns the aqueous suspensions obtained, possibly dried, and their uses in the paper, paint, plastics and mastics industry.

30 Claims, No Drawings

PROCEDURE FOR MANUFACTURE OF AQUEOUS SUSPENSIONS OF CALCIUM CARBONATE AND SUSPENSIONS OBTAINED, AND THEIR USES

This is a U.S. national phase of PCT Application No. PCT/IB2009/006173, filed Jul. 7, 2009, which claims priority to European Application No. 08 012 233.6, filed Jul. 7, 2008.

The present invention concerns the field of mineral materials obtained by grinding in a wet medium, possibly dried and intended for applications in the industry of paper, paint, plastics and mastics, and more particularly concerns a process for manufacture of aqueous suspensions by grinding of calcium carbonate in a wet medium with a view to obtaining an aqueous suspension of calcium carbonate used in the paper industry.

Ground natural calcium carbonate—or GCC—is a mineral pigment commonly used in coatings intended to cover paper sheets, and to give the latter certain optical properties such as opacity. This calcium carbonate is initially used in the form of an aqueous suspension, which is more simple to transport, handle and decant than a dry powder. The said suspension is then used in the composition of a paper coating, the latter being used to coat the paper sheet.

A method for manufacturing such a suspension consists in grinding in the water the said calcium carbonate in the presence of a grinding aid agent, until a certain granulometry is obtained, i.e. a certain distribution of particle sizes. During this stage an agent known as a "grinding aid agent", the function of which is to facilitate the mechanical grinding action, is used. This is generally a homopolymer or a copolymer of acrylic acid, obtained by traditional polymerisation processes, in emulsion or in solution (see notably documents FR 2 539 137, FR 2 683 536, FR 2 683 537, FR 2 683 538, FR 2683 539, FR 2 683 532 and FR 2 683 533).

In a second stage, the dry extract of this suspension, i.e. the quantity by dry weight of calcium carbonate relative to the total weight of the suspension, is increased by elimination of water, by this means enabling an end product to be delivered which is as rich as possible in mineral matter.

It is important then to have an aqueous suspension of mineral matter which remains sufficiently fluid over time. This property can be apprehended very simply through measurements of Brookfield™ viscosity of the suspension, immediately after grinding, and subsequently 8 days later, provided the medium has not been stirred. By this means possible inconsistencies of the viscosity of the suspension, which the skilled man in the art will seek to avoid, are revealed: this is a part of the technical problem resolved by the present invention.

Another constraint, incorporated by the present invention, is to obtain a suspension of calcium carbonate leading to as high as possible an opacity of the coated paper sheet. And it has been known for a long time that opacity is linked to a certain distribution of individual particle sizes of calcium carbonate within the aqueous suspension. This distribution must be as "close" as possible; reference is also made to a "vertical" granulometric distribution, with regard to the shape of the graph obtained (percentage by weight of the particles having a given diameter as a function of the diameter).

The "verticality" or "closeness" of the distribution of the particle sizes is reflected by the "slope factor", f, a parameter well-known to the skilled man in the art. This slope factor is calculated as being equal to the ratio between the percentage by weight of particles the diameter of which is less than a diameter $d_1$ and the percentage by weight of the particles the diameter of which is less than another diameter $d_2$, i.e.:

$$f = (d_1/d_2) \times 100$$

The higher the slope factor, the "closer" the distribution of the particle sizes, and the better will be the opacity of the final coated paper. This idea is notably supported in the document "Pigment concepts for improved paper and print properties" (P. Burn, ATIP Conference, Jun. 23, 2000 Tour), especially on page 4.

Thus, document EP 0 894 836 describes an aqueous suspension of GCC, one of the characteristics of which lies in a slope factor ($d_{50}/d_{20}$) of between 1.5 and 2, and preferentially between 1.5 and 1.75. Bearing in mind the particular definition given to the slope factor, this invention is indeed directed towards a close distribution of particle sizes: it is also indicated that the opacity of the final products is improved thereby.

Similarly, document WO 2007/031870, which describes the co-grinding of a precipitated calcium carbonate, or PCC, with a GCC, in an aqueous medium, allows a co-ground pigment to be obtained with a slope factor $100 \times (d_{30}/d_{70})$ of over 30, preferentially 40, and very preferentially 45, and allows the opacity of the final paper to be increased (see table 2).

In the same sense, the skilled man in the art is also familiar with documents EP 0 850 685, WO 00/39029 and EP 0 894 833, which disclose a process the aqueous suspension preparation stage of which is undertaken such as to reach a solid content no higher than 40%, or again document EP 0 607 840, which discloses a process the solid matter concentration of which is less than or equal to 24%.

In parallel to this, another option for this need initially to grind the calcium carbonate to obtain a high slope factor consists in the skilled man in the art seeking to maximise the final dry extract through the second stage of elimination of water, which is particularly costly in terms of energy. Ideally, it would therefore be necessary to grind the calcium carbonate until as high as possible a dry extract is obtained, in order to minimise the water evaporation stage, whilst retaining a high slope factor with a view to doping the opacity of the coated paper.

Continuing their research to offer the skilled man in the art a solution allowing:
- a higher slope factor than with the grinding aid agents of the prior art, and therefore an improved or at least equalled opacity to be obtained,
- whilst initially grinding at the same concentration, and whilst eliminating water until the same final dry extract,
- a final aqueous suspension to be obtained which is stable over time, the Applicant has developed a process to manufacture an aqueous suspension of natural calcium carbonate characterised in that it includes the following stages:
a) pre-grinding the calcium carbonate under dry and/or wet conditions until an average diameter of 0.5 to 500 μm ($d_{50}$) in the presence or absence of dispersing agents, notably as described in French patent application FR 07 01591,
b) forming an aqueous suspension of the product derived from stage a) having a dry calcium carbonate content of between 10% and 80%, preferentially between 30% and 50%, and very preferentially between 35% and 45%, c) grinding the suspension derived from stage b) in the presence of a homopolymer and/or a copolymer of (meth)acrylic acid simultaneously having an average by weight molecular weight of between 8,000 g/mole and 15,000 g/mole, preferentially between 10,000 g/mole and 14,000 g/mole, more preferentially between 11,000 g/mole and 13,000 g/mole, and very preferentially of the order of 12,000 g/mole, and also having a molar content of polymeric chains of molecular weight of less than 3,000 g/mole, of less than 20%, preferentially less than 15%, and very preferentially less than 10%, d) possibly concentrating the aqueous suspension obtained in stage c) by any known means so as to obtain a calcium carbonate content at least equal to 5% above the concentration of stage b) or c), preferentially between 60% and 80% by weight, and very preferentially between 65% and 75% by weight, e) possibly adding a dispersing agent to the aqueous suspension during or after stage d), f) possibly drying by any known means the product obtained in stage c) or d) or e).

It should be noted that throughout the present Application, the average by weight ($M_w$) molecular weights, like the molar contents of polymeric chains, the molecular weight of which is less than a certain value, are determined according to a particular method as described in the introduction to the examples.

Thus, and in a surprising manner, compared to a prior art using a traditional grinding aid agent, i.e. a homopolymer and/or a copolymer of (meth)acrylic acid which does not meet the previous two conditions, the homopolymers and the copolymers of the (meth)acrylic acid used in the process according to the invention allow: whilst grinding with the same dry extract as for the prior art, a higher slope factor $100*(d_{25}/d_{75})$ and thus a better opacity (S) to be obtained, whilst also manufacturing aqueous suspensions which are stable over time.

In concrete terms, the skilled man in the art many years ago identified a parameter which, measured in terms of the suspension of calcium carbonate, changes in the same way as the opacity of the coated paper sheet: this is the light diffusion coefficient of the suspension (S expressed in $m^2/kg$), where the latter is applied on to a support. In the present Application, we shall rely notably on the measurement of this coefficient S in the aqueous suspension of calcium carbonate (the method for measuring the coefficient S is indicated in document FR 2 885 906).

Thus, one of the merits of the Applicant is that they successfully identified that the choice of a range of specific average by weight molecular weights, in combination with a limited fraction of polymeric chains of low molecular weight, constituted the optimum combination to obtain an aqueous suspension which was at once stable and had a high slope factor, which is synonymous with an improved opacity of the coated paper sheet.

Moreover, it is easy for the skilled man in the art to manufacture polymers having this combination of characteristics, notably using techniques known as "separation" techniques, and controlled radical polymerisation methods such as, notably, the technique known as the "RAFT" (reversible addition-fragmentation transfer) technique.

The first are relatively old methods (start of the 80s), which seek to "purify" the polymer as obtained after its synthesis. They use stages enabling populations of polymeric molecular chains having a given molecular weight to be isolated (through a choice of appropriate solvents and temperatures) and lead, firstly, to a given average by weight molecular weight being obtained, and to the chosen content for the polymeric chains having, for example, a molecular weight less than a certain limit. The skilled man in the art can notably refer to document U.S. Pat. No. 4,507,422.

The second techniques are manufacturing techniques which, notably through the use of particular catalysts, allow the distribution of the molecular weights during the polymerisation reaction to be controlled. The choice of the synthesis conditions (such as, notably, the catalyst/monomers used ratio) enables the skilled man in the art to attain both a given average by weight molecular weight, and a polymeric chains content the molecular weight of which is less than a certain limit. The skilled man in the art may notably refer to documents WO 02/070571, WO 2004/014967 and WO 2005/095466 (the content of which is included in the reference in the present application, and notably in relation with claim 4 of the present application), and also to the publications "Dispersion of calcite by poly(sodium acrylate) prepared by reversible addition-fragmentation chain transfer (RAFT) polymerization" (Polymer (2005, 46(19), 2005, pp 8565-8572) and "Synthesis and Characterization of Poly(acrylic acid) Produced by RAFT Polymerization. Application as a Very Efficient Dispersant of CaCO3, Kaolin and TiO2" (Macromolecules, 36(9), 2003, pp 3066-3077).

Moreover, it is important to stress that none of the abovementioned documents with regard to the methods for separation and for controlled radical polymerisation relates in a particular manner to a process of manufacture of calcium carbonate, by grinding followed by concentration in an aqueous medium. It will be noted here that this is a very particular process, as presented in document WO 02/49765, where an acrylic polymer with very specific neutralisation rates in mono- and di-valent cations leads to an aqueous suspension with a low quantity of grinding aid agents not adsorbed on the surface of the calcium carbonate. Furthermore, none of the abovementioned documents concerning the separation and controlled radical polymerisation techniques gives any information concerning the capacity of a homopolymer or a copolymer of (meth)acrylic acid to be a satisfactory activator of opacity, if the said homopolymer meets both particular conditions forming the subject of the present invention.

Thus, a first object of the invention consists of a process to manufacture an aqueous suspension of natural calcium carbonate characterised in that it includes the following stages:

a) pre-grinding the calcium carbonate under dry and/or wet conditions until an average diameter of 0.5 to 500 μm ($d_{50}$), in the presence or absence of dispersing agents, b) forming an aqueous suspension of the product derived from stage a) having a dry calcium carbonate content of between 10% and 80%, preferentially between 30% and 50%, and very preferentially between 35% and 45%, c) grinding the suspension derived from stage b) in the presence of a homopolymer and/or of a copolymer of (meth)acrylic acid simultaneously having an average by weight molecular weight of between 8,000 g/mole and 15,000 g/mole, preferentially between 10,000 g/mole and 14,000 g/mole, more preferentially between 11,000 g/mole and 13,000 g/mole, and very preferentially of the order of 12,000 g/mole, and also having a molar content of polymeric chains of molecular weight of less than 3,000 g/mole, of less than 20%, preferentially less than 15%, and very preferentially less than 10%, d) possibly concentrating the aqueous suspension obtained in stage c) by any known means so as to obtain a calcium carbonate content at least equal to 5% above the concentration of stage b) or c), preferentially between 60% and 80% by weight, and very preferentially between 65% and 75% by weight, e) possibly adding a dispersing agent to the aqueous suspension during or after stage d), f) possibly drying by any known means the product obtained in stage c) or d) or e).

In a first variant, this process is also characterised in that the said homopolymer and/or copolymer of (meth)acrylic acid is obtained by radical polymerisation in emulsion or in solution, followed by at least one static or dynamic stage, where the said separation stage uses one or more polar solvents preferentially belonging to the group constituted by water, methanol, ethanol, propanol, isopropanol, the butanols, acetone, tetrahydrofuran or their blends.

In a second variant, this process is also characterised in that the said homopolymer and/or copolymer of (meth)acrylic acid is obtained by controlled radical polymerisation, preferentially by polymerisation by reversible addition-fragmentation transfer (RAFT).

It is important to stress that the skilled man in the art has, using his knowledge and the state of the technique, all the necessary elements to manufacture a polymer verifying the twin characteristic forming the subject of the present Application: in this sense, he is capable of synthesising the polymers forming the subject of the present invention. This is, notably, emphasised in the state of the technique relative to the manufacture of acrylic polymers, with a view to controlling both their molecular weight and their polymolecularity index (and thus naturally the rate of oligomers, or the proportion of polymeric chains the molecular weights of which are lower than a certain value). Reference may be made to the abovementioned documents (see top of previous page).

In this second variant, this use is also characterised in that the polymerisation by reversible addition-fragmentation transfer (RAFT) uses at least one chain transfer agent, as claimed in documents WO 02/070571, WO 2004/014967 and WO 2005/095466 (the content of which is included as a reference in the present application, and notably in relation with claim 4 of the present application).

Generally, this process is also characterised in that the said homopolymer and/or copolymer of (meth)acrylic acid is totally acid, or totally or partially neutralised by a neutralisation agent chosen from among the sodium, potassium or lithium hydroxides, the calcium or magnesium hydroxides and/or oxides, ammonium hydroxide, the lithium carbonates or hydrogencarbonates, or their blends, preferentially by a neutralisation agent chosen from among sodium or potassium hydroxide, ammonium hydroxide, or their blends, and very preferentially by a neutralisation agent which is sodium hydroxide.

Generally, this process is characterised in that, in addition to the (meth)acrylic acid, the said copolymer of (meth)acrylic acid contains another monomer chosen from among (meth) acrylic anhydride, (meth)acrylamide, the (meth)acrylic esters, and preferentially from among the methyl, ethyl, isopropyl, n-propyl, isobutyl, n-butyl, ter-butyl, or 2-ethylhexyl acrylates, the methyl or ethyl methacrylates, the hydroxylate methacrylates, styrene, alpha-methylstyrene, styrene sulfonate, or acrylamido-2-methyl-2-propane-sulphonic acid, the acrylate and methacrylate phosphates of ethylene glycol, and their blends, and in that this other monomer is preferentially acrylamide.

This process is also characterised in that the said homopolymer and/or copolymer of (meth)acrylic acid is used at a rate of 0.1 to 1.0%, and preferentially 0.2 to 0.6%, by dry weight, relative to the dry weight of calcium carbonate.

This process is also characterised in that, in addition to the said homopolymer and/or copolymer of (meth)acrylic acid, another homopolymer and/or copolymer of (meth)acrylic acid is used jointly during the concentration stage d).

This process is also characterised in that the concentration by dry weight of calcium carbonate of the aqueous suspension obtained following the grinding stage c) is between 10% and 80% of the total weight of the said suspension, preferentially between 30% and 50%, and very preferentially between 35% and 45%.

In a variant, this process is also characterised in that the dry weight concentration of calcium carbonate of the aqueous suspension obtained following the concentration stage d) is at least equal to 5% above the concentration of the product in stage b) or c), is preferentially between 60% and 80%, and very preferentially between 65% and 75%.

Another object of the invention lies in the aqueous suspension of calcium carbonate containing the said homo- or copolymer, together with its use in the industry of paper, paint, plastics and mastics, and more particularly its use in paper applications such mass fillers or coatings.

The invention also lies in paper coatings or the composition of mass fillers containing the said aqueous suspension of calcium carbonate.

EXAMPLES

Preamble

Throughout the present Application, the granulometric characteristics relative to the calcium carbonate are determined using a Sedigraph™ 5100 device, sold by the company MICROMERITICST™.

The light diffusion factor S is determined according to the method given in document FR 2 885 906.

The average by weight ($M_w$) molecular weights and the molar contents of polymeric chains the molecular weight of which is less than a given value are determined using the following method.

A test portion of the polymer solution corresponding to 90 mg of dry matter is introduced into a 10 mL flask. Mobile phase, with an additional 0.04% of DMF, is added, until a total mass of 10 g is reached. The composition of this mobile phase is as follows: NaHCO3: 0.05 mole/l, NaNO3: 0.1 mole/l, triethanolamine: 0.02 mole/l, NaN3 0.03% by mass.

The CES chain consists of an isocratic pump of the Waters™ 510 type, the flow rate of which is set at 0.8 mL/min., a Waters 717+ sample changer, a kiln containing a precolumn of the "Guard Column Ultrahydrogel Waters™" type, followed by a linear column of the "Ultrahydrogel Waters™" type, which is 30 cm in length and has an internal diameter of 7.8 mm.

Detection is accomplished by means of a Waters™ 410 type differential refractometer. The kiln is heated to a temperature of 60° C., and the refractometer is heated to a temperature of 45° C.

The CES is calibrated with a series of sodium polyacrylate standards supplied by Polymer Standard Service having maximum molecular weight of between 2,000 and $1.10^6$ g/mole and of polymolecularity index of between 1.4 and 1.7, and also with a sodium polyacrylate of average by weight molecular weight equal to 5,600 g/mole and polymolecularity index equal to 2.4.

The calibration graph is of the linear type and takes account of the correction obtained using the flow rate marker (DMF).

Acquisition and processing of the chromatogram are accomplished through use of the PSS WinGPC Scientific v 4.02 application. The chromatogram obtained is incorporated in the area corresponding to molecular weights higher than 65 g/mole.

Example 1

This example illustrates a process for the manufacture of calcium carbonate by grinding followed by concentration, according to the invention or according to the prior art, where a single dispersing polymer is used during the concentration stage. It illustrates the influence of the polymers used during the grinding stage on the stability of the suspensions obtained at the end of the process (measurement of certain Brookfield™ viscosities at different times), and also on the distribution of the particle sizes—slope factor $f=100 \times (d_{25}/d_{75})$—and on the light diffusion coefficient (S).

For each of the tests n° 1 to 10, an aqueous suspension of calcium carbonate is formed to be ground in water, using the methods well known to the skilled man in the art (reference may be made to the grinding protocol as described in document WO 02/49765).

This calcium carbonate is a Carrara marble which has been pre-ground under dry conditions until a median diameter approximately equal to 10 µm is obtained. The purpose of this grinding stage is to obtain a calcium carbonate dry weight content equal to 50% of the total weight of the suspension.

It is undertaken in the presence of 0.45% by dry weight of a polymer according to tests n° 1 to 10, relative to the total dry weight of calcium carbonate.

In a subsequent stage, the suspension is concentrated using a thermal laboratory evaporator of EPCON™ brand until a concentration by dry weight of calcium carbonate is obtained equal to 71% of the total weight of the suspension.

This stage of concentration is accomplished in the presence of 0.25% by dry weight relative to the dry weight of calcium carbonate, of a blend (70/30 ratio by dry weight) of a homopolymer of acrylic acid, of average by weight molecular weight equal to 10,400 g/mole, 100% of the carboxylic sites of which in terms of moles are neutralised by sodium hydroxide, and of phosphoric acid.

Test n° 1

This test illustrates the prior art and uses a homopolymer of acrylic acid (according to document WO 02/49765) obtained by traditional radical polymerisation not followed by a separation, 50% of the carboxylic sites of which in terms of moles are neutralised by sodium, 15% by calcium and 15% by magnesium, of average by weight molecular weight equal to 9,600 g/mole, and 25% of the polymeric chains of which in terms of moles have a molecular weight less than 3,000 g/mole.

Test n° 2

This test illustrates the prior art and uses a homopolymer of acrylic acid obtained by traditional radical polymerisation not followed by a separation, totally neutralised by sodium hydroxide, of average by weight molecular weight equal to 3,100 g/mole, and 65% of the polymeric chains of which in terms of moles have a molecular weight less than 3,000 g/mole.

Test n° 3

This test illustrates the prior art and uses a homopolymer of acrylic acid obtained by traditional radical polymerisation followed by a separation, totally neutralised by sodium hydroxide, of average by weight molecular weight equal to 5,500 g/mole, and 37% of the polymeric chains of which in terms of moles have a molecular weight less than 3,000 g/mole.

Test n° 4

This test illustrates the prior art and uses a homopolymer of acrylic acid obtained by traditional radical polymerisation not followed by a separation, totally neutralised by sodium hydroxide, of average by weight molecular weight equal to 5,700 g/mole, and 40% of the polymeric chains of which in terms of moles have a molecular weight less than 3,000 g/mole.

Test n° 5

This test illustrates the prior art and uses a homopolymer of acrylic acid obtained by RAFT means, totally neutralised by sodium hydroxide, of average by weight molecular weight equal to 8,150 g/mole, and 24% of the polymeric chains of which in terms of moles have a molecular weight less than 3,000 g/mole.

Test n° 6

This test illustrates the prior art and uses a homopolymer of acrylic acid obtained by traditional radical polymerisation not followed by a separation, totally neutralised by sodium hydroxide, of average by weight molecular weight equal to 9,400 g/mole, and 27% of the polymeric chains of which in terms of moles have a molecular weight less than 3,000 g/mole.

Test n° 7

This test illustrates the prior art and uses a homopolymer of acrylic acid obtained by traditional radical polymerisation not followed by a separation, totally neutralised by sodium hydroxide, of average by weight molecular weight equal to 33,100 g/mole, and 17% of the polymeric chains of which in terms of moles have a molecular weight less than 3,000 g/mole.

Test n° 8

This test illustrates the prior art and uses a homopolymer of acrylic acid obtained by RAFT means, totally neutralised by sodium hydroxide, of average by weight molecular weight equal to 31,000 g/mole, and 12% of the polymeric chains of which in terms of moles have a molecular weight less than 3,000 g/mole.

Test n° 9

This test illustrates the invention and uses a homopolymer of acrylic acid obtained by traditional radical polymerisation followed by a separation, totally neutralised by sodium hydroxide, of average by weight molecular weight equal to 11,500 g/mole, and 17% of the polymeric chains of which in terms of moles have a molecular weight less than 3,000 g/mole.

Test n° 10

This test illustrates the invention and uses a homopolymer of acrylic acid obtained by RAFT means, totally neutralised by sodium hydroxide, of average by weight molecular weight equal to 10,800 g/mole, and 18% of the polymeric chains of which in terms of moles have a molecular weight less than 3,000 g/mole.

Test n° 11

This test illustrates the invention and uses a copolymer of acrylic acid/methacrylic acid (90/10 in terms of % by weight) obtained by traditional radical polymerisation followed by a separation, totally neutralised by sodium hydroxide, of average by weight molecular weight equal to 11,000 g/mole, and 16% of the polymeric chains of which have a molecular weight less than 3,000 g/mole.

Test n° 12

This test illustrates the invention and uses a copolymer of acrylic acid/methacrylic acid (90/10 in terms of % by weight) obtained by the RAFT method, totally neutralised by sodium hydroxide, of average by weight molecular weight equal to 9,000 g/mole, and 16% by mole of the polymeric chains of which have a molecular weight less than 3,000 g/mole.

In table 1, the characteristics of the polymers used during the grinding stage are recalled. The values of the dry extracts after grinding stage c) and concentration stage d) (noted respectively $ES_c$ and $ES_d$) are also given, together with the % by weight of particles the diameters of which are less than 1 µm and 2 µm (noted respectively %<1 µM and %<2 µm).

TABLE 1

|  | Test n° | | | | |
|---|---|---|---|---|---|
|  | 1 | 2 | 3 | 4 | 5 |
| Prior Art/Invention ("IN") | PA | PA | PA | PA | PA |
| $M_w$ (g/mole) | 9,600 | 3,100 | 5,500 | 5,700 | 8,150 |
| % <3,000 g/mole | 25 | 65 | 37 | 40 | 24 |
| $ES_c$ (%) | 49.6 | 51.7 | 49.8 | 50 | 50 |
| $ES_d$ (%) | 71.3 | 71.2 | 71.0 | 71.1 | 71.0 |
| % (by weight) <1 µm | 73.2 | 73.7 | 74.9 | 73.9 | 73.2 |
| % (by weight) <2 µm | 96.2 | 95.6 | 93.3 | 96.0 | 96.0 |

|  | Test n° | | | | |
|---|---|---|---|---|---|
|  | 6 | 7 | 8 | 9 | 10 |
| Prior Art/Invention ("IN") | PA | PA | PA | IN | IN |
| Mw (g/mole) | 9,400 | 33,100 | 31,000 | 11,500 | 10,800 |
| % <3,000 g/mole | 27 | 17 | 12 | 17 | 18 |
| ESa (%) | 50 | — | — | 50.5 | 51.4 |
| Esb (%) | 71.4 | — | — | 71.0 | 71.0 |
| % (by weight) <1 µm | 73.7 | — | — | 73.4 | 73.2 |
| % (by weight) <2 µm | 95.8 | — | — | 96.3 | 96.1 |

|  | Test n° | |
|---|---|---|
|  | 11 | 12 |
| Prior Art/Invention ("IN") | IN | IN |

TABLE 1-continued

| Mw (g/mole) | 11 000 | 9 000 |
|---|---|---|
| % <3,000 g/mole | 16 | 16 |
| ESa (%) | 51.0 | 51.1 |
| Esb (%) | 71.0 | 71.0 |
| % <1 µm | 73.2 | 73.2 |
| % <2 µm | 96.1 | 96.0 |

The measurements could not be made for tests no 7 and 8, since grinding was not possible. These polymers, which have an average by weight ($M_w$) molecular weight which is too high, do not enable calcium carbonate to be ground as far as achieving a dry extract close to 50%.

In a second stage, for tests n° 1 to 6, and 9 to 12, the stabilities of the suspensions obtained were determined, by measuring their Brookfield™ viscosities at times t=0 and t=8 days (without prior stirring, at 25° C. and at 10 revolutions/minute), and noted respectively $\mu_0$ and $\mu_8$ (mPa·s). These results are shown in table 2.

TABLE 2

|  | Test n° | | | | |
|---|---|---|---|---|---|
|  | 1 | 2 | 3 | 4 | 5 |
| Prior Art/Invention ("IN") | PA | PA | PA | PA | PA |
| $M_w$ (g/mole) | 9,600 | 3,100 | 5,500 | 5,700 | 8,150 |
| % <3,000 g/mole | 25 | 65 | 37 | 40 | 24 |
| $\mu_0$ (mPa·s) | 490 | 6,300 | 240 | 250 | — |
| $\mu_8$ (mPa·s) | 7,000 | 21,100 | 2,700 | 4,700 | 5,400 |

|  | Test n° | | | | |
|---|---|---|---|---|---|
|  | 6 | 9 | 10 | 11 | 12 |
| Prior Art/Invention ("IN") | PA | IN | IN | IN | IN |
| Mw (g/mole) | 9,400 | 11,500 | 10,800 | 11,000 | 9,000 |
| % <3,000 g/mole | 27 | 17 | 18 | 16 | 16 |
| $\mu_0$ (mPa·s) | 300 | 560 | 350 | 550 | 650 |
| $\mu_8$ (mPa·s) | 9,300 | 2,400 | 3,100 | 3,200 | 3,200 |

It is observed that the viscosities obtained for tests n° 1, 2, 5 and 6 are much higher than 5,000 mPa·s after 8 days; the corresponding aqueous suspension is then difficult to handle and notably to pump. Such tests are not satisfactory for the skilled man in the art.

In a final, third stage, in the case of suspensions in which grinding was able to be accomplished, and for which the Brookfield™ viscosities (at 25° C. and at 10 revolutions/minute, 8 days before stirring) were less than 5,000 mPa·s, their slope factor $f=100*(d_{25}/d_{75})$ was determined, together with their light diffusion coefficient S. These results are shown in table 3.

TABLE 3

| Test n° | 3 | 4 | 9 | 10 | 11 | 12 |
|---|---|---|---|---|---|---|
| Prior Art/Invention ("IN") | PA | PA | IN | IN | IN | IN |
| $M_w$ (g/mole) | 5,500 | 5,700 | 11,500 | 10,800 | 11,000 | 9,000 |
| % < 3,000 g/mole | 37 | 40 | 17 | 18 | 16 | 16 |
| $d_{25}/d_{75} * 100$ | 31.0 | 30.4 | 32.3 | 34.0 | 32.0 | 32.0 |
| S (m²/kg) | 136 | 138 | 141 | 144 | 140 | 140 |

Table 3 demonstrates clearly that only tests n° 9 to 12 corresponding to the invention lead to a notable improvement of the slope factor and of the opacity.

To summarise, only the homopolymers and the copolymers of acrylic acid obtained by RAFT means or by separation techniques, and which have the dual characteristic of having a molecular weight of between 8,000 g/mole and 15,000 g/mole, on the one hand, and of having a molar content of polymeric chains having a molecular weight of less than 3,000 g/mole of less than 20%, allow:

- calcium carbonate to be ground under the conditions of the example,
- with a view to obtaining suspensions the rheological properties of which after 8 days are in accordance with the requirements of the skilled man in the art,
- and the slope factor and light diffusion coefficient S of which have been improved.

The invention claimed is:

1. A process for preparing a calcium carbonate product comprising the following stages:
   a) pre-grinding calcium carbonate under dry and/or wet conditions to obtain an average diameter of 0.5 to 500 µm ($d_{50}$), with or without a dispersing agent,
   b) forming an aqueous suspension of the product derived from stage a) having a dry calcium carbonate content of between 10% and 80%,
   c) grinding the suspension derived from stage b) in the presence of a homopolymer and/or copolymer of (meth)acrylic acid having (i) an average molecular weight of between 8,000 g/mole and 15,000 g/mole, and (ii) less than 20% by mole of polymeric chains having a molecular weight less than 3,000 g/mole,
   d) optionally concentrating the aqueous suspension obtained in stage c),
   e) optionally adding a dispersing agent to the aqueous suspension during or after stage d),
   f) optionally drying the product obtained in stage c) or d) or e).

2. The process according to claim 1, wherein the aqueous suspension formed in stage b) has a dry calcium carbonate content of between 30% and 50%.

3. The process according to claim 1, wherein the aqueous suspension formed in stage b) has a dry calcium carbonate content of between 35% and 45%.

4. The process according to claim 1, wherein the homopolymer and/or copolymer of (meth)acrylic acid in stage c) has an average molecular weight of between 10,000 g/mole and 14,000 g/mole.

5. The process according to claim 1, wherein the homopolymer and/or copolymer of (meth)acrylic acid in stage c) has an average molecular weight of between 11,000 g/mole and 13,000 g/mole.

6. The process according to claim 1, wherein the homopolymer and/or copolymer of (meth)acrylic acid in stage c) has an average molecular weight of about 12,000 g/mole.

7. The process according to claim 1, wherein the homopolymer and/or copolymer of (meth)acrylic acid in stage c) has less than 15% by mole of polymeric chains having a molecular weight less than 3,000 g/mole.

8. The process according to claim 1, wherein the homopolymer and/or copolymer of (meth)acrylic acid in stage c) has less than 10% by mole of polymeric chains having a molecular weight less than 3,000 g/mole.

9. The process according to claim 1, wherein the homopolymer and/or copolymer of (meth)acrylic acid is obtained by radical polymerization in emulsion or in solution, followed by at least one static or dynamic stage, and wherein the homopolymer and/or copolymer is obtained with one or more polar solvents selected from water, methanol, ethanol, propanol, isopropanol, a butanol, acetone, or tetrahydrofuran or any blend thereof.

10. The process according to claim 1, wherein the homopolymer and/or copolymer of (meth)acrylic acid is obtained by controlled radical polymerization.

11. The process according to claim 1, wherein the homopolymer and/or copolymer of (meth)acrylic acid is obtained by polymerization by reversible addition-fragmentation transfer (RAFT).

12. The process according to claim 11, wherein the polymerization by reversible addition-fragmentation transfer (RAFT) uses at least one chain transfer agent.

13. The process according to claim 1, wherein the homopolymer and/or copolymer of (meth)acrylic acid is totally acidic, or totally or partially neutralized by a neutralization agent selected from sodium, potassium or lithium hydroxide, calcium or magnesium hydroxide, calcium or magnesium oxide, ammonium hydroxide, lithium carbonate or hydrogen carbonate, or any blend thereof.

14. The process according to claim 1, wherein the homopolymer and/or copolymer of (meth)acrylic acid is totally neutralized by sodium hydroxide, potassium hydroxide, ammonium hydroxide, or any blend thereof.

15. The process according to claim 1, wherein the homopolymer and/or copolymer of (meth)acrylic acid is totally neutralized by sodium hydroxide.

16. The process according to claim 1, wherein the homopolymer and/or copolymer of (meth)acrylic acid is a homopolymer of acrylic acid.

17. The process according to claim 1, wherein the homopolymer and/or copolymer of (meth)acrylic acid is a homopolymer of acrylic acid that is totally neutralized by sodium hydroxide.

18. The process according to claim 1, wherein the homopolymer and/or copolymer of (meth)acrylic acid is a copolymer of acrylic acid and methacrylic acid.

19. The process according to claim 1, wherein the homopolymer and/or copolymer of (meth)acrylic acid is a copolymer of acrylic acid and methacrylic acid that is totally neutralized by sodium hydroxide.

20. The process according to claim 1, wherein in addition to (meth)acrylic acid, the copolymer of (meth)acrylic acid contains another monomer chosen from (meth)acrylic anhydride, (meth)acrylamide, or a (meth)acrylic ester, a methyl, ethyl, isopropyl, n-propyl, isobutyl, n-butyl, tert-butyl or 2-ethylhexyl acrylate, a methyl or ethyl methacrylate, a hydroxylate methacrylate, styrene, alpha-methylstyrene, styrene sulfonate, acrylamido-2-methyl-2-propane-sulphonic acid, an acrylate or methacrylate phosphate of ethylene glycol, or any blend thereof.

21. The process according to claim 1, wherein in addition to (meth)acrylic acid, the copolymer of (meth)acrylic acid contains acrylamide.

22. The process according to claim 1, wherein the homopolymer and/or copolymer of (meth)acrylic acid is present at 0.1 to 1.0% by dry weight, relative to the dry weight of calcium carbonate.

23. The process according to claim 1, wherein the homopolymer and/or copolymer of (meth)acrylic acid is present at 0.2 to 0.6% by dry weight, relative to the dry weight of calcium carbonate.

24. The process according to claim 1, wherein the calcium carbonate is present at a dry weight concentration of between 10% and 80% of the total weight of the suspension following grinding stage c).

25. The process according to claim 1, wherein the calcium carbonate is present at a dry weight concentration of between 30% and 50% of the total weight of the suspension following grinding stage c).

26. The process according to claim 1, wherein the calcium carbonate is present at a dry weight concentration of between 35% and 45% of the total weight of the suspension following grinding stage c).

27. The process according to claim 1, wherein concentration stage d) is performed resulting in calcium carbonate being present at a dry weight concentration of between 60% and 80% of the total weight of the suspension.

28. The process according to claim 1, wherein concentration stage d) is performed resulting in calcium carbonate being present at a dry weight concentration of between 65% and 75% of the total weight of the suspension.

29. The process according to claim 1, wherein step e) is performed.

30. The process according to claim 1, wherein step f) is preformed.

* * * * *